United States Patent [19]

Taylor

[11] Patent Number: 5,423,891
[45] Date of Patent: Jun. 13, 1995

[54] METHOD FOR DIRECT GASIFICATION OF SOLID WASTE MATERIALS

[76] Inventor: Robert A. Taylor, 368 Ferry Point Rd., Pasadena, Md. 21122

[21] Appl. No.: 57,770

[22] Filed: May 6, 1993

[51] Int. Cl.⁶ .............................................. C10J 3/20
[52] U.S. Cl. .................... 48/197 R; 48/197 A; 48/209
[58] Field of Search ................. 48/197 R, 197 A, 111, 48/209; 201/2, 5, 11, 25; 585/240, 241; 423/445 R, 449.7, 449.8, 449.9

[56] References Cited

U.S. PATENT DOCUMENTS

| | | | |
|---|---|---|---|
| 3,008,894 | 11/1961 | Culbertson | 201/12 |
| 3,616,266 | 10/1971 | Hall et al. | 201/12 |
| 3,787,292 | 1/1974 | Keappler | 48/111 |
| 4,308,103 | 12/1981 | Rotter | 48/111 |
| 4,439,209 | 3/1984 | Wilwerding et al. | 48/111 |
| 4,448,588 | 5/1984 | Cheng | 48/111 |
| 4,557,204 | 12/1985 | Faehnle | 48/197 R |
| 4,618,735 | 10/1986 | Bridle et al. | 585/240 |
| 4,686,008 | 8/1987 | Gibson | 585/241 |
| 4,935,038 | 6/1990 | Wolf | 48/197 R |
| 5,084,141 | 1/1992 | Holland | 585/241 |

FOREIGN PATENT DOCUMENTS

| | | | |
|---|---|---|---|
| 0011037 | 5/1980 | European Pat. Off. | 48/111 |
| 3102389 | 9/1982 | Germany | 48/209 |
| 3539956 | 5/1987 | Germany | 48/209 |
| 4041284 | 6/1991 | Germany | 207/25 |

OTHER PUBLICATIONS

"Spent-tire pyrolysis may add bounce to recycling", Chemical Engineering, Aug. 2, 1976, p. 52.

Primary Examiner—Peter Kratz
Attorney, Agent, or Firm—Sughrue, Mion, Zinn, Macpeak & Seas

[57] ABSTRACT

Direct gasification of a high BTU content fuel gas from a hydrocarbon content solid waste material W which may include some glass content is effected by preheating heat carrier solids HCS in a flash calciner to a temperature capable of thermally cracking the hydrocarbon content of the solid waste material W directly into the high BTU content fuel gas. The HCS are separated from the products of combustion and fed into a gas sealed refractory lined horizontal axis rotary kiln retort concurrently with the solid waste W. Momentary contact and mixing of the solid waste W with the HCS in the rotary kiln in the absence of oxygen is sufficient to directly thermally crack the solid waste material into the high BTU gas product. Separated HCS are returned to the flash calciner for reheating. A trommel, coupled directly to the output of the rotary kiln retort and having a trommel screen with mesh openings smaller than glass agglomerates, but sized larger than the HCS, permits separation of the HCS and discharging of glass agglomerates from the downstream end of the trommel screen to prevent shut down of the direct gasification unit. Direct gasification of steel industry waste water treatment plant sludge, automobile shredded refuse ASR, municipal solid waste MSW and refuse derived fuel RDF and oil mill scale is effectively achieved, irrespective of glass content contaminant.

22 Claims, 3 Drawing Sheets

FIG. 1

METHOD FOR DIRECT GASIFICATION OF SOLID WASTE MATERIALS

This invention relates to a method and apparatus for direct gasification of solid waste by heating solid waste materials continuously in the absence of air to high temperature to directly produce a high BTU gas, and more particularly to a method and apparatus which utilizes a rotary retort and a flash calciner for significantly improving the efficiency of the direct gasification process.

BACKGROUND OF THE INVENTION

Our society generates a tremendous amount of hydrocarbon and carbohydrate-based waste. Some wastes are easily segregated and recycled, while others are not. A variety of waste based on available technology cannot be economically recycled into a usable, saleable, clean, high BTU content gas.

The United States generates over 200,000,000 tons per year of municipal solid waste (MSW). This waste contains many different types of carbonaceous materials like hydrocarbon based, carbohydrate and cellulose-based materials.

MSW typically contains on a dry basis the following percentage of components:

| Volatile Matter | 79.56% |
| --- | --- |
| Fixed Carbon | 9.98% |
| Ash | 20.46% |
| C | 45.52% |
| H | 5.75% |
| N | 0.29% |
| O | 37.79% |
| S | 0.19% |

Cl 0.43–1.54%

Some municipalities have installed plants that separate the burnable fraction from metals and other non-burnables. The burnable material is commonly called Refuse Derived Fuel (RDF). It contains leather, rubber, plastics, paper, yard waste, etc.

The United States scraps about 10,000,000 automobiles per year. A large portion of the automobiles are shredded. After shredding, the non-metal portion is separated from the metallics in air classifiers or like means. Such material is commonly called "fluff" or Automobile Shredder Residue (ASR). Such material is light and fluffy. Over 1.5 million tons of ASR per year are generated. Currently, ASR is being land filled, using up very valuable space.

It is almost impossible to economically separate the plastics using solvent extraction or other chemical or mechanical methods from the fluff. The fluff normally includes polyurethanes, leather, vinyls, glass, nylons and other thermal and heat-setting plastics.

Automobile and truck tires continue to be a disposal problem throughout the United States. In addition to the 200 million tires discarded in this country every year, there exist another one billion tires in piles.

The steel industry uses large quantities of oil in the production of sheet and strip steel products. A large percentage of rolling oils, lubricating oils, and hydraulic oils eventually are removed in the waste water treatment plant in the form of a high oil content sludge. A typical large, integrated steel mill generates between 50,000 and 100,000 tons per year. The major steel industry mills have an on-site plant to treat and separate their waste water coming from the finishing part of the mill. The sludge typically contains:

| Oil | 5–15% Dry Basis |
| --- | --- |
| Solids | 95–85% Dry Basis |
| Water | 30–60% |

Such oil containing sludge is stockpiled openly to the atmosphere such that acid rain leaches out the oil and other heavy metals. A typical steel mill may stockpile between 300,000 to 800,000 tons of the waste water treatment plant sludge.

Some of the oil from the rolling operation in a typical steel mill ends up in mill scale. Mill scale is also stockpiled outside where the oil may leach into the ground. Mill scale typically contains:

| Oil | 1–15% |
| --- | --- |
| Iron Oxide | 60–75% |

One U.S. mill is currently trying a detergent process to wash out the oil. The oily wash water goes to the waste water treatment plant, where some of the oil accumulates in the sludge.

Over the past several decades, there have been attempts to volatize hydrocarbons from such solid waste. Such processes have included indirect retort processes. Heat Carrier Solids (HCS) have been used to remove hydrocarbons from solids. In the 1970's, Tosco used aluminum oxide balls to recover oil from oil shale.

U.S. Pat. No. 3,008,894 issued Nov. 14, 1961 to W. J. Culbertson, Jr. is exemplary of oil recovery from oil shale.

Similar processes use fine particle HCS to recover oil from oil-bearing solids. In these processes, the objective is to produce a distillate liquid that can either become feed stock for an oil refinery or other oil-based product.

Another method employed in the past for heating solids indirectly is through a metallic or ceramic shell, such as an indirectly-fired heated retort. A limitation to this approach is the amount of heat that can be transferred through the thickness of the metallic or ceramic shell.

More recently, Battelle of Columbus, Ohio has effected gasification of wood chips and RDF in a biomass gasification process, producing medium-BTU product gas. U.S. Pat. No. 4,828,581 exemplifies the Battelle approach, utilizing two circulating fluid bed reactors, one of which is a gasification reactor in which the biomass is converted into a medium BTU gas and residual char, and a second, is a combustion reactor that burns the residual char to provide heat for the direct gasification of the biomass. Heat transfer between the reactors is accomplished by circulating sand (HCS) between the gasifier and the combustor.

While the Battelle process effects direct gasification of wood chips and RDF, such process and apparatus requires the use of steam or nitrogen to maintain two fluidized beds, increasing the process cost by the fluidization, while additionally requiring extraneous energy and extraneous fluid to support the particles in the fluidizing bed reactors. The energy cost of the system is quite high, and the fluidized bed combustor also requires a source of compressed air, both of which may not be readily available on the situs of the gasification apparatus.

It therefore a primary object of this invention to provide an indirect retort process for treatment of shredded MSW and like waste, with increased thermal efficiency in an apparatus and process which is highly simple, and which is applicable for direct gas conversion of a variety of hydrocarbon content waste that to date cannot either be technically or economically recycled into a usable, saleable clean and high BTU content gas.

It is a further object of this invention to provide a method and apparatus for the direct gasification of municipal and like waste, which automatically removes acids and particulates from materials in the gas phase, which eliminates the need for fluidized beds or like lifting devices in the direct gasification of the waste, and in heating the Heat Carrying Solids (HCS) prior to contact with the treatable waste.

These and other objects of the present invention will be more clearly understood by reference to the following description and to the accompanying drawings.

DETAILED DESCRIPTION OF THE PREFERRED EMBODIMENTS

In general, the process and apparatus of the present invention is based on the concept of heating hydrocarbon content waste materials continuously in the absence of air to high temperature to produce a high BTU gas. The temperature selected is that temperature which thermally cracks the hydrocarbon Organic materials to carbon and gas. This is accomplished by adding and storing the process heat requirement in Heat Carrying Solids (HCS). The type of HCS may vary; for example the HCS may be iron oxide, aluminum oxide, refractory inert, fine mesh sand, or retorted residue from the starting waste material.

Figure 1:
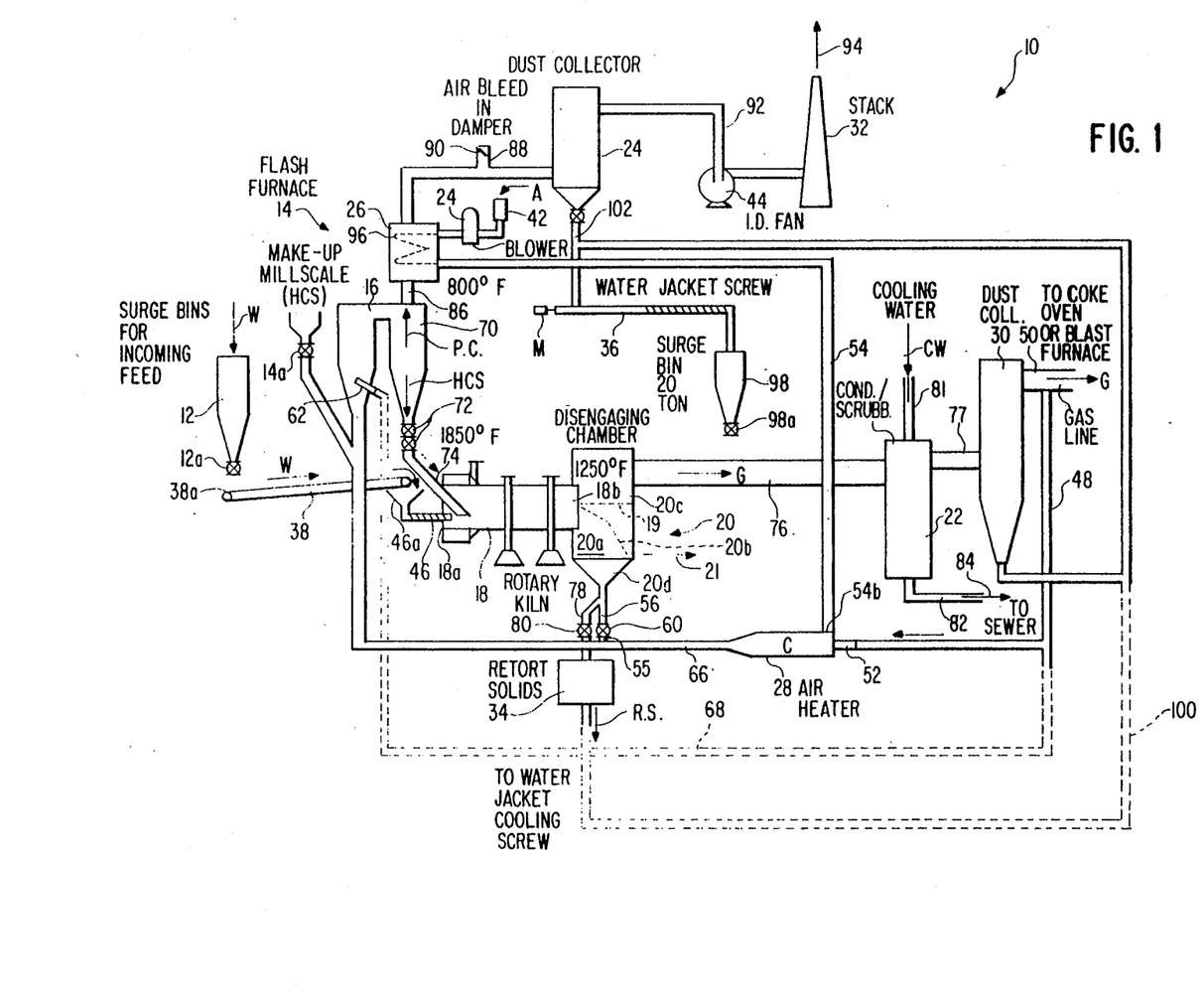
FIG. 1 is a schematic flow sheet illustrating the relationship of the various elements of the apparatus employed in practicing the invention as a preferred embodiment thereof.

FIG. 1, illustrating a solid waste direct gasification apparatus practicing the method of the invention and forming a preferred embodiment, is a flow diagram. A typical operation involves the treatment of a steel mill waste water treatment plant sludge or waste W containing for example 60% water, 15% hydrocarbons and 25% solids. To effect the desired heat transfer from the HCS, 10 pounds of solids are required for each pound of sludge heated to 1200° F. In the embodiment of FIG. 1, the HCS may be one half inch diameter balls, or a fine mesh sand or granular type material. As will be seen hereinafter, for purposes of illustration, makeup HCS in the form of mill scale is supplied as needed to the circulating HCS to maintain the desired heat transfer to ensure that the waste water treatment plant sludge is heated to the desired 1200° F. to 1400° F. in the absence of oxygen to effect by pyrolysis, the direct gasification of the hydrocarbon content of the waste W.

Figure 3:
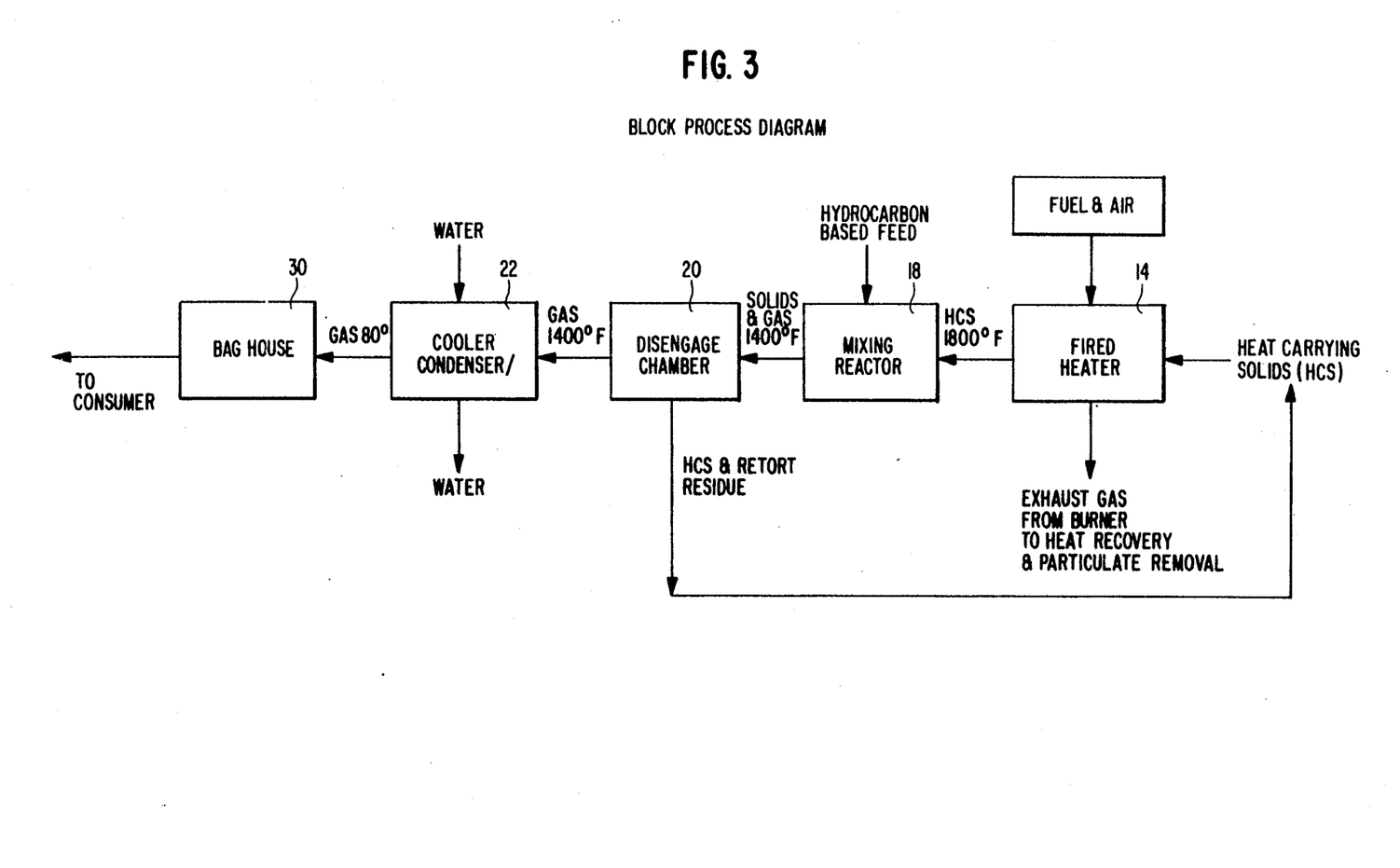
FIG. 3 is a block diagram of the process practice by the apparatus of FIG. 1.

FIG. 3 is a schematic block diagram of the direct gasification of a hydrocarbon containing solid waste material utilizing the apparatus and process parameters as set forth in the flow diagram of FIG. 1, with the retorted solids (RS) and the HCS separated in the disengage chamber recirculated to the fired heater of the flash calciner. The block diagram of FIG. 3 illustrates in a sequence from right to left, the timing and entry of the fuel and air to the fired heater of a flash furnace 14, along with the heat carrying solids (HCS), the removal of the exhaust gas from a mixing reactor 18 for heat recovery and for separation of particulates, and the initial provision of both fuel and air to the fired heater 14. With the recirculation of the separated HCS and retort residue from a downstream disengage chamber 20, which is preferably a cyclone separator back to the fired heater, the carbon content of the retorted solids may constitute sufficient fuel to heat the incoming HCS to the desired 1800° F. temperature, prior to mixing of the HCS with the hydrocarbon based feed stock in the rotary kiln mixing reactor 18. The block diagram also shows the high BTU gas product after separation from the HCS and retorted solids in the disengage chamber 20 further subjected to a water spray in a condenser/scrubber 22. The gas leaving cyclone separator 20 is subject to particulate separation at a bag house 30 downstream of the condenser/scrubber 22.

The block diagram evidences the simplicity yet effectiveness of the invention and emphasizes the basic process steps of the invention and the apparatus practicing that process. The direct gasification of the hydrocarbon based waste feed stock is achieved utilizing minimal energy input with effective use of the carbon content of the retorted solids as part or all of the fuel for reheating the heat carrying solids HCS at the fired heater of the flash calciner.

Turning to FIG. 1, the principal components of the direct gasification system or apparatus 10 consist of a surge bin or Sins 12 for incoming waste water treatment plant sludge W, flash furnace 14 including a flash calciner 16, the rotary kiln 18, the cyclone separator 20 for separating the usable, saleable, clean and high BTU content gas G, a condenser/scrubber 22 for condensing and removal of condensable liquids from the separated gas G, the bag house or dust collector 30, a combustion air preheater 26, a combustion air heater 28, and a containment free stack 32.

Additional components for the system 10 will be identified in the following description, which describes the process or method steps to produce the high BTU fuel gas G, which may be advantageously delivered directly to a coke oven or blast furnace (not shown) at a steel plant site, where the solid waste direct gasification apparatus is preferably located.

Fresh high hydrocarbon containing steel mill waste water treatment plant sludge indicated by the arrow W is maintained in one or more surge bins 12 overlying a waste feed inlet system 38 and preferably continuously fed at a predefined flow rate onto the upper run of the endless conveyor belt 38a under the control of a metering or outlet valve 12a of the surge bin 12. The waste W drops into an inlet hopper 46a of a feed screw 46 which discharges into the inlet end 18a of the rotary kiln 18.

The rotary kiln 18 may be a commercial, refractorily lined rotary kiln incinerator such as that manufactured by the Fuller Co. of Bethlehem, Pa. or the Finch Environmental Corporation of West Pittston, Pa.

In the process of this invention, the HCS, which is continuously circulated within a loop including the flash calciner 16 of flash furnace 14, rotary kiln 18, cyclone separator 20 and a portion of heater discharge duct 66 of the flash calciner 16, effects the direct contact heating of the high hydrocarbon content waste material W in the rotary kiln 18.

The flash calciner 16 comprises a swirl-type furnace in which fuel is combusted in intimate contact with particulate material. In the illustrated apparatus, fuel is initially supplied to the air heater 28 via a fuel supply line, which preferably is bleed line 48 from gas product line 50 on the discharge side of the bag house 30. Bleed line 48 is coupled to a fuel nozzle 52 which forms one element of air heater 28. A combustion air supply line 54 opens to combustion chamber C of the air heater at 28, proximate to the outlet of fuel nozzle 52 where ignition is effected. The products of combustion of the fuel and air mixture are discharged from the combustion chamber and flow to the flash calciner 16.

The accumulated HCS are fed into the products of combustion at the junction 55 of a retorted solids discharge duct 56 and air heater discharge duct 66 under control of a valve 60 within duct 56. Within the flash calciner 16, the turbulent swirling mixture of combustion gases and retorted solids, principally HCS, along with any supplemental fuel supplied to supplemental fuel nozzle 62 from bleed line 48 via supplemental fuel feed line 68 is further combusted. The turbulent swirling mixture of combustion gases, fuel and HCS produces a highly uniform temperature profile throughout the flash furnace 14.

A cyclone separator 70 at the outlet of the flash calciner 16 separates the combustion gas from the now heated HCS. Useful to the gasification process is the feature of the flash calciner 16, that conventional flame temperatures associated with combustion are never attained as the intimate contact with the HCS absorbs the excess heat instantaneously. As such, the hot HCS at approximately 1850° F., separated from the combustion gases by centrifugal force, fall by gravity into the bottom of the cyclone separator. The hot HCS pass through control valves 72 and are delivered by an oblique discharge duct 74 directly into the inlet end 18a of the rotary kiln.

The rotary kiln 18 is refractory lined and consists of an elongated rotary drum rotating about a horizontal axis H, being driven at a predefined speed. The internal surface of the refractory lined retort 18 is configured, as by helical ribs, to drive the HCS material from left to right, i.e. from inlet end 18a to outlet end 18b of the rotary kiln. The rotary kiln 18, which may be a Fuller-Traylor® rotary kiln, facilitates the high efficiency, near instantaneous heat transfer between the hot particles of the HCS and the hydrocarbon material waste W. The interior of the rotary kiln is sealed and the atmosphere lacks oxygen to prevent combustion, but instead causes the direct conversion of the hydrocarbon content of the waste W into carbon and gas. With the temperature of the HCS entering the rotary kiln at near 1800° F., this provides a ΔT of 400° to 600° F. The temperature may be reduced to below 1400° F. to minimize or prevent agglomeration of glass if the waste has significant glass content, depending upon whether glass is clear, green or brown glass, all having different melting temperatures. In a system 10 under a predescribed flow rate, a given weight HCS is heated in the flash calciner 16 to a temperature that, in turn, will heat the waste W in the rotary kiln 18 to a temperature adequate to effect the direct conversion of the hydrocarbons to carbon and gas, usually between 1200° F. and 1500° F.

The reaction time is limited, otherwise, the hydrocarbon content of the waste material W is distilled off to produce a vapor that condenses at ambient conditions. Tests show that heating the waste material W to 1200° to 1400° F. converts all the convertible material to carbon and gas. The parameters of the rotary kiln operation are controlled, so that with adequate mixing of the HCS and the hydrocarbon waste material W, in kiln 18 the reaction time is between 0.5 to 2 minutes. Utilizing the rotary kiln heat transfer action, due to the tremendous surface area of the HCS, along with adequate mixing of the HCS during transport horizontally through the rotary kiln 18, produces tremendous heat transfer rates. For each ton of wet sludge W, there is between 1000 to 1 million square feet of heat transfer surface area depending upon the HCS size and shape. It is this high surface area ratio that produces instant heat transfer.

In the illustrated embodiment, the HCS is then immediately separated downstream of the rotary kiln from the retorted solids RS of the waste W, using cyclone separator 20, with the mixture of HCS and retorted solids discharging through rotary kiln outlet 18b into the disengaging chamber 20a of cyclone separator 20. A trommel 19 is preferably incorporated in the cyclone separator 20 having a mesh size capable of retaining agglomerated glass particles while passing the HCS and RS through the mesh openings. The agglomerated glass particles 21 are discharged from trommel 19 after separation. A gas outlet 20b opens tangentially to product gas G gas discharge line 76. A conical lower portion 20d of the cyclone separator casing 20c opens to retorted solids discharge line 56. Depending upon the desired makeup of the HCS, the HCS can be separated from the retorted solids RS of the waste via cyclone separator 20, as illustrated, through elutriation, or through screening. The separate HCS is reheated via direct contact with the products of combustion discharging from air heater 28 during passage through duct 66 connecting the air heater 28 at the downstream end of the combustion chamber C to the flash calciner 16 and by further heating in the flash calciner 16. In certain cases, the retorted solids RS of the treated hydrocarbon content waste material W, such as mill scale or waste water treatment plant sludge, function adequately as the HCS.

Schematically in the embodiment of FIG. 1, cyclone discharge duct 56 feeds the HCS back into duct 66 on the discharge side of the air heater 28 and upstream of the flash calciner 16, along with retorted solids RS of the waste material W in one mode of operation. Alternatively and in most cases, the HCS is separated from the retorted solids as indicated by the arrow RS, FIG. 1, which retorted solids RS are collected in a retort discharge hopper 34 within a discharge branch duct 78, which branches from duct 56. Flow of retorted solids RS to hopper 34 is controlled by a valve 80 and which opens directly to the retorted solids hopper.

The production gas G exiting the rotary kiln or retort 18 and separated by the cyclone separator 20 passes via gas discharge line 76 into the condenser/scrubber 22 which receives cooling water indicated by arrow CW, via tube 81. The cooling water in spray form condenses out any condensable content of the production gas flow discharging from the cyclone separator 20. A condensate drain pipe or line 82 open to the bottom of the scrubber, permits passage of the condensed liquids 84 to a sewer or the like. The particulates are separated from the production gas in the bag house or dust collector 30 connected to condenser/scrubber 22 via duct 77, and the final gas product G of high BTU content and free of contaminants leaves the dust collector 30 at the top via production gas supply line 50. In the example of the illustrated embodiment, the production gas G is employed as fuel for a steel plant coke oven or blast furnace. The condensate or waste water 84 can be treated using conventional and pertinent waste water technology.

With respect to the products of combustion within the flash calciner 16, those products of combustion, as indicated by the arrow PC, pass upwardly from the top of the cyclone separator 70, through the air preheater 26, via combustion gas removal duct 86 to a second bag house or dust collector 24. Fresh air is bled into duct 86 via air bleed duct 88, controlled by damper 90, which opens to the atmosphere. This permits some air to mix with the products of combustion PC discharging from the cyclone separator 70 prior to entering the bag house or dust collector 24. A bag house PC discharge duct 92 feeds to the stack 32, where the contaminant-free, clean gas is discharged at the top thereof, as indicated by arrow 94. I.D. fan 44 in bag house PC discharge duct 92 ensures the removal of the products of Combustion PC from the cyclone separator 20 and discharge thereof into the bottom of the stack 32.

Figure 2:
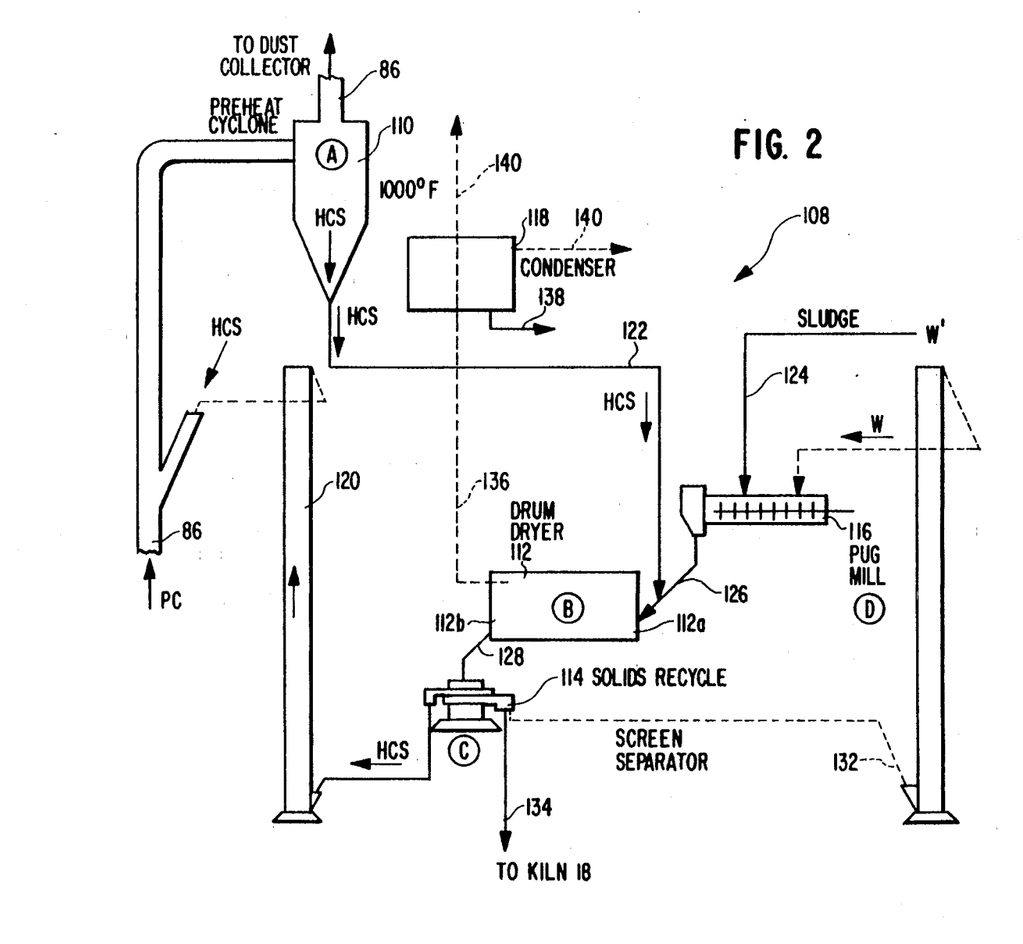
FIG. 2 is a process flow diagram of a drying stage as an optional modification of the preferred embodiment of FIG. 1.

Preferably, system 10 uses recuperative heat exchange to preheat the incoming air stream to air heater 28. The compressed air supply line 54 opens at one end to the atmosphere via air filter 42. Line 54 includes an air blower 25 for forced flow and compression of the air through a looped heat exchanger coil 96 internally of air preheater 26 and about discharge duct 86 carrying the products of combustion PC from the cyclone separator 70 to stack 32. The combustion air, shown schematically by arrow A, is preheated to approximately 800° F. within the air preheater 26. Assuming that the retorted solids RS separated within the cyclone separator 20 do not function as the HCS for the system, nor are recirculated with the HCS, those retorted solids may be fed commonly via the water jacket screw 36 to a retorted solids surge bin 98 for storage. A water jacket cooling screw retorted solids supply line, indicated in dotted lines at 100 may optionally connect the outlet of the retorted solids hopper 34 to the discharge duct 102. Duct 102 connects the second bag house or dust collector 24 to the water jacket screw 36 driven by a motor M. The screw 36 feeds the excess solids from the system at bug house or dust collector 24 and retort discharge hopper 34 into the top of the storage surge bin 98. Periodically, those excess solids may be removed under control of a shut off valve 98a at the bottom of the 20 ton surge bin.

Where the hydrocarbon content waste material is essentially dry such as fluff or Automobile Shredder Residue (ASR), tires, municipal waste MW, or Refuse Dry Fuel (RDF), such hydrocarbon waste may be fed directly from a surge bin 12 to the inlet end 18a of the refractory line rotary kiln 18. Where, however, the hydrocarbon content waste is in form of waste water treatment plant sludge with water content from 30% to 60%, as in the embodiment of the invention of FIG. 1, it may be necessary to include a drying stage in such system. FIG. 2 illustrates a drying stage indicated generally at 108 to be optionally included in the system or apparatus 10 of FIG. 1. In FIG. 2, the same elements from the system of FIG. 1 bear like numerical designations. In this case, some of the HCS content is preheated and fed to an additional equipment rotary drum dryer mixed with the wet sludge W' prior to feeding of dry sludge W to the rotary kiln 18 of the system, with the flow of the HCS controlled so that the temperature in the drum dryer is sufficient to adequately remove the moisture and provide a relatively dry sludge W to the kiln.

The major components of the drying stage 108 resides in a preheat cyclone separator 110, a drum dryer 112, a screen separator 114, a pug mill 116 and a drying stage condenser 118.

The drying stage HCS, which may be continuously fed in a continuous loop path including a HCS feed line or duct 120, is fed to the discharge duct 86 for the products of combustion at the top of the flash furnace cyclone separator 70 of FIG. 1, for preheating prior to those products of combustion PC passing to the air preheater 26. To simplify the description, the break in the duct or line 86 as labeled, in FIG. 2, is between the flash calciner 16 and the bag house or dust collector 24 of FIG. 1. The drying stage heat carrier solids HCS mixing with and being carried by the hot gas from the flash calciner to the dust collector under the operation of the ID fan 44, FIG. 1, in the direction of arrow labeled PC, FIG. 2, enter preheat cyclone separator 110, where, in flowing with the products of combustion PC from the flash calciner 16 to the preheat cyclone separator, the HCS has its temperature increased to about 1000° F. After separation by centrifugal force in the preheat cyclone separator 110, the HCS, collecting by gravity in the bottom of separator 110, pass through a preheat cyclone separator solids discharge duct or line 122 to the inlet end 112a of the drum dryer 112, along with a mixture of wet sludge from the surge bin or bins 12 for the incoming feed of the system, FIG. 1, and illustrated schematically by the arrow 124. The wet sludge W' enters pug mill 116, which pug mill mixes the wet sludge W' with dry sludge W bled from the solids separated by screen separator 114 downstream of the drum dryer 112. The rotary drum dryer 112 is similar in operation to the rotary kiln 118 in the sense that the device is a drum, is mounted for rotation about a horizontal axis, is driven in rotation at desired speed, has internally, means for driving the mixture of wet and dry sludge and HCS from right to left and from inlet end 112a to outlet end 112b and the drum dryer is sealed in the manner of the rotary kiln 18 of FIG. 1 The outlet line or duct 126 from the pug mill merges with the discharge line 122 from the preheat cyclone separator at inlet end 112a of the drum dryer 112. The mixture of the wet and dry sludge in a preferred mode of operation in turn mixes with the HCS internally of drum 112 and direct heat transfer is effected sufficient to remove the moisture from the wet sludge. The temperature of the HCS along with the feed rate of wet sludge W' (alone) or wet sludge W' mixed with a portion of dry sludge W emanating from the discharge side of the screen separator 114 determines the amount of moisture removed from the wet sludge prior to directing the sludge W to the kiln 118 of FIG. 1. In that respect, on the outlet end or discharge side 112b of the drum drier, the solids content of the drum dryer passes via line 128 to the inlet of the screen separator 114. The screen separator 114 separates the HCS from the now dry sludge W, and the dry sludge W passes to the inlet 118a of the rotary kiln 18 of the apparatus of FIG. 1. The separated HCS content is recirculated as described above via line 120 to the preheat cyclone. A solids recycle line 132 branches from the dry sludge discharge line 134 to supply a portion of the dry sludge W back to the pug mill 116. That line 132 is dotted to indicate the optional nature of the solids recycle loop, via line 132. The moisture content of the wet sludge W' reaching the pug mill 116 via line 124, may not require mixing with dry sludge prior to entry into the drum dryer 112. For wet, sticky sludges, part of the dried solids, of necessity, are mixed with the wet sludge to improve the handling characteristics in the pug mill 116. As may be appreciated, the pug mill 116 itself may be omitted from the system.

As a result of the heat transfer from the HCS to the wet sludge W' within the drum dryer, the moisture within the sludge W' is driven off principally as 99% steam, although there may be a 1% vapor content which is not water based. The steam and vapor is preferably directed via a drum dryer steam discharge line 136 to the drying stage condenser 118. The water, as well as any other condensate such as oil, condenses within the condenser 118 and collects in the bottom of the condenser 118 for liquid discharge through liquid discharge duct or line 138. Line 138 may be connected to the scrubber condensate discharge line 84, FIG. 1. Non-condensable gas may optionally be removed from the condenser 118 via gas outlet line 140 shown in dotted form. Where that gas content is a combustible gas, line 140 may be fed to the branch fuel line 48, FIG. 1, and provide some modicum of fuel to fire the air heater 28 of the system of FIG. 1.

In the preferred embodiment of the invention as exemplified by drawing FIGS. 1 and 2 and the process description within the specification employing the apparatus components operating under the method steps of the present invention, an effective indirect heating process results which effectively and cheaply directly converts hydrocarbons, carbohydrates, etc. into a high BTU gas and carbon. With the HCS in the form of balls or fine mesh sand, or like granular type material, the process readily transfers large quantities of heat at high temperatures between 1200° to 1400° F./ Efficient low cost plants, in accordance with the invention, can adequately process 50 to 200 tons per hour of shredded MSW or other organic-based waste, using the process and apparatus of the preferred embodiment. Not only does the direct heat gasification process produce a useful commercial, high BTU gas product, from hydrocarbon content waste material, but such product gas G may be easily purified by removing particulate and acid content prior to combustion. The process and apparatus of the present invention as described directly gasifies the hydrocarbon content of the waste material to produce gas and carbon and not distillate oils from organic-type waste. As a byproduct, the direct gasification process of the present invention produces in addition to a high BTU fuel gas inert, solids which readily pass the EPA TCLP test for lead.

Importantly, the process and apparatus of the present invention as set forth in detail in applicant's preferred embodiment, FIGS. 1 and 2, and as exemplified in the block diagram of FIG. 3 operating under the parameters stated herein, are highly effective in treating the waste materials set forth specifically within the specification. The invention has application to other hydrocarbon wastes, which are generated and discarded such as plastic wire insulation, textile-based waste such as carpet scrap, oil waste from oil refineries, scrap wood, etc.

In the examples, which follow, the feed stock varies from example to example, however, the HCS employed in the direct gasification of the hydrocarbon content of waste feed stock, employs a suitable HCS, which may vary and be of the type set forth specifically within the specification above. However, the invention is not restricted to such feed stock or HCS and the system operating parameters as set forth specifically herein.

The examples which follow constitute results from bench-type experiments and pilot plant runs involving utilization of significant amounts of both the hydrocarbon bearing waste solids W and heat carrying solids HCS preheated to temperatures on the order of 1800° F., with mixing occurring within a horizontal cylindrical reactor or equivalent and with process parameters such as those set forth in the description of the preferred embodiment herein or simulations thereof. The analysis of the solid waste feed stock W and that of the direct gasification gas product G produced by the process with minimal contact time between the mixed hydrocarbon containing solid waste feed stock and the hot HCS in the absence of oxygen, show significant BTU content and the retorted solids RS have significant carbon content permitting burning of the carbon as fuel in the fired heater for heating the heat carrying solids HCS upon recirculation to the heater 14 simulating the preheat action of the flash calciner 16 of FIG. 1. In example 5, while the municipal solid waste MSW acting as the feed stock is similar to refuse derived fuel (RDF) discussed in the background of the invention, it contained significant, relatively large size metal and another non-burnable constituents such as glass. For purposes of comparison, such MSW would be economically unfeasible as hydrocarbon bearing solid waste feed stock for waste treatment and fuel product recovery systems utilizing fluidized bed reactors and/or fluidized bed furnaces for increasing the temperature of the recirculated heat carrying solids HCS prior to mixing, with the feed stock in the second fluidized bed reactor.

EXAMPLE 1

In a bench-type experiment, 4,90 # (2,221 gms) of oily sludge at 61° F. analyzing:

| Solids | 30.0% |
| --- | --- |
| Oil & Grease | 9.1% |
| Water | 60.9% | was added to 33.9# of mill scale (HCS) after preheating the HCS to a temperature of 1555° F. The oily sludge solid waste W was added to a horizontal cylindrical reactor in 3 to 5 minute increments of about one pound each. The process produced 1.47# of retorted solids, 2.98# water and 0.4# of high BTU direct gasification gas product G. The residual oil and grease content of the retorted solids (RS) was 800 ppm and the carbon content was 5.6%. The direct gasification gas product contained 995 BTU and analyzed:

| Hydrogen | 34.69% |
| --- | --- |
| Carbon Dioxide | 5.23% |
| Propane | 0.75% |
| Propylene | 10.98% |
| Acetylene | 0.14% |
| Ethylene | 18.01% |
| Ethane | 6.11% |
| Oxygen | 0.03% |
| Nitrogen | 0.80% |

| -continued | |
|---|---|
| Methane | 21.64% |
| Carbon Monoxide | 1.62% |

EXAMPLE 2

In a bench-type experiment, 5.09# of automobile shredder fluff (ASR) was mixed with 32.1# of iron oxide HCS heated to 1350° F. The process produced 2.69# of solids and 2.44# of gas.

The direct gasification gas product contained 910 BTU/Ft$^3$ and analyzed:

| | |
|---|---|
| Hydrogen | 30.47% |
| Carbon Dioxide | 11.69% |
| Propane | 0.43% |
| Propylene | 7.42% |
| Acetylene | 0.13% |
| Ethylene | 16.27% |
| Ethane | 5.88% |
| Oxygen | 0.27% |
| Nitrogen | 1.35% |
| Methane | 26.09% |
| Carbon Monoxide | 13.69% |

The Total Lead in the retorted solids (RS) was 0.32% and the TCLP Lead was 0.35 mg/l. The carbon content was 4.6%

EXAMPLE 3

In a bench-type experiment, 5.09# of shredded rubber tires solid waste W, whose thread portion of 1″ to 3″ particles contained steel, was mixed with iron oxide mill scale (HCS) heated to 1728° F. The temperature of the resultant mixture was 1617° F. The percentage of the materials produced were:

| Material | % | Weight | Oil & Grease Content | % Carbon |
|---|---|---|---|---|
| Residue | 27.2 | 1.38# | 440 ppm | 81.5 |
| Steel | 22.3 | 1.14# | | |
| Gas | 46.5 | 2.32# | | |
| Tarry | 5.0 | .25# | | |

A tarry residual emulsion liquid was added back into the retort where it cracked to carbon and gas at a retort temperature of 1400°.

The retorted solids (RS) residue contained 440 ppm of oil and grease, and the carbon content was 81.5%.

The direct gasification gas product contained 843 BTU/Ft$^3$ and analyzed:

| | |
|---|---|
| Hydrogen | 20.36% |
| Carbon Dioxide | 8.80% |
| Propane | 0.19% |
| Propylene | 3.45% |
| Acetylene | 0.22% |
| Ethylene | 16.23% |
| Ethane | 4.36% |
| Oxygen | 0.72% |
| Nitrogen | 3.69% |
| Methane | 31.19% |
| Carbon Monoxide | 10.79% |

EXAMPLE 4

In this bench-type experiment, 5.6# of oily mill scale solid waste W containing 5% water and 3% oil was mixed with 19# aluminum oxide balls (HCS) heated to 1550° F. The resultant temperature was 1410° F. The experiment produced:

| Material | Gas % | Weight | Oil & Grease % | % Carbon |
|---|---|---|---|---|
| Mill scale | 92 | 5.15# | 500 pm | 1.1 |
| Water | 5 | 0.28# | | |
| Gas | 3 | 0.17# | | |

The direct gasification gas product G contained 905 BTU/Ft$^3$ and analyzed:

| | |
|---|---|
| Hydrogen | 32.67% |
| Carbon Dioxide | 4.18% |
| Propane | 1.25% |
| Propylene | 12.03% |
| Acetylene | 0.18% |
| Ethylene | 14.94% |
| Ethane | 5.61% |
| Oxygen | 0.06% |
| Nitrogen | 1.80% |
| Methane | 24.71% |
| Carbon Monoxide | 2.57% |

EXAMPLE 5

In this experiment, 1.20# of municipal waste MW was heated with 12# of aluminum oxide balls preheated 1711° F. The residual temperature of the mixture was 1373° F. after 1.5 minutes. The RDF produced 0.92# of gas and 0.28# of retorted solids residue.

| Volume BD | Analyses |
|---|---|
| % Gasified | 76.60% |
| % Residue | 23.40% |
| % Ash after combustion | 17.60% |
| % Weight reduction | 82.40% |
| % Volume reduction | 92.00% |
| Residue Bulk Density | 25#/Ft$^3$ |
| BTU content of retorted solids (RS) residue | 3,590 BTU/# |

The direct gasification gas product contained 573 BTU/Ft$^3$ and analyzed:

| | |
|---|---|
| Hydrogen | 8.85% |
| Carbon Dioxide | 7.44% |
| Propane | 0.19% |
| Propylene | 2.66% |
| Acetylene | 0.17% |
| Ethylene | 11.52% |
| Ethane | 3.32% |
| Oxygen | 6.78% |
| Nitrogen | 29.31% |
| Methane | 19.65% |
| Carbon Monoxide | 10.11% |

A serious problem in processing materials containing glass like RDF and ASR is the glass content. In a fluidized or entrained bed in prior art practice, the glass reaches a softening point and sticks or agglomerates the HCS. These agglomerates grow and will eventually shut down the process. Attempts have been made to solve this problem by displacing the contaminated HCS with fresh HCS, but this is expensive and not feasible in Japan, where the contaminated HCS must be disposed of by burying in landfills, and landfill space is very costly.

The process and apparatus of the present invention has the added capability of removing glass from the system. Particularly where the waste W to be treated takes the form of automobile shredder fluff (ASR) with significant glass content, the glass becomes molten, tends to agglomerate into sizable particles, and must be removed from the system. This is particularly true where the HCS is heated to relatively high temperatures in the order of 1400° F. to 1800° F. prior to mixing with the feed stock W. The present invention solves the problem by two different ways. The applicant has determined that if the HCS temperature is controlled along with the mixture percentages of HCS to feed stock W and the extent of time of direct heating contact between HCS and feed stock, the glass will not agglomerate. Control is effected by measuring the residual mixture temperature of the HCS and retorted ash (carbon). The amount of ash particles, the chemistry and amount of glass present in the feed stock W will dictate the HCS temperature and thus the residual mixture temperature of the HCS and retorted ash. As an example of one set of conditions, where the HCS was limited in its heating to 1324° F. and mixed with the residue to a residual mixture temperature of 1289° F. agglomeration of glass was practically nil and insufficient to adversely affect the process.

The invention additionally provides a solution to the problem of glass agglomeration by the use of a trommel 19 in applicant's FIG. 1 system. This permits system operation at higher temperature than that providing a residual mixture temperature of the HCS and retorted ash at 1289° F. The applicant determined that at residual temperatures of 1400° F., the glass will form agglomerates in excess of 8 mesh size. By selection of a HCS size which is smaller than the glass agglomerates (in such example by using a trommel 19 screen with 10 mesh openings), it is possible to separate HCS in the −10 mesh to 50 mesh size from an oversized agglomerate. If necessary, an elutriation step may be added to separate very light carbonaceous particles from the oversize particles and HCS, the very light carbonaceous particles forming a commercially useful fuel for burning on site, or for transport to off site fuel burners as a solid high BTU product in addition to the high BTU product gas G of the gasification system or apparatus of FIG. 1. If some agglomerates are the same size as the HCS, they will eventually agglomerate to a larger size if recirculated with the HCS over time, permitting the larger size agglomerates to be separated adequately by the screen of the trommel 19.

The following examples identify parameters associated with the problem of glass agglomeration and the separation of the same.

EXAMPLE 6

In this pilot plant experiment, 9# of shredded RDF at 45° F. was mixed with 50# of aluminum oxide HCS at 1334° F. The residual mixture temperature was 1289° F. There was no sign of glass agglomerations with the HCS. In this example, the trommel 19 was dispensed with, since it was unnecessary.

EXAMPLE 7

In this pilot plant experiment, 17# of RDF at 51° F. was mixed with 74# of aluminum oxide HCS at 1700° F. The HCS mesh size was −8 mesh +14 mesh. The residual mixture temperature of the HCS and retorted ash was 1425° F. The mixture was screened by trommel 19 and all the glass agglomerates were +8 mesh with no visible agglomeration below 8 mesh present in the bottom 20D of the disengaging chamber or cyclone 20, accumulating the separated HCS and the ash (below 8 mesh). The sodium oxide content, a glass indicator, of the HCS was only 0.1% after nine runs.

While the invention has been described in the form of a preferred embodiment, and although directed to a plurality of different solid waste materials having significant hydrocarbon content, it should be understood that modifications and changes can be made herein without departing from the invention and from the following claims:

I claim:

1. A method of direct gasification of a hydrocarbon content solid waste material W to produce a high BTU content fuel gas, said method comprising the steps, in sequence, of:

preheating heat carrier solids HCS in a flash calciner including a furnace combusting a fuel and oxygen mixture to a temperature sufficient to thermally crack the hydrocarbon content of the solid waste material W directly into said high BTU content fuel gas;

separating hot HCS from the products of combustion of the fuel and oxygen mixture;

feeding the hot HCS into a gas sealed refractory lined horizontal axis rotary kiln retort concurrently with said hydrocarbon containing solid waste W in the absence of oxygen;

mixing the solid waste W with HCS in said rotary kiln retort by solid-to-solid contact in the absence of oxygen for a time sufficient to heat the solid waste material W to a temperature at which all of the hydrocarbon content of the solid waste material W is converted by thermal cracking directly into a high BTU gas product and retorted solids RS including carbon;

separating the HCS and retorted solids RS from the gas product;

recirculating at least the separated HCS back to the furnace of the flash calciner for reheating to a temperature such that when the reheated HCS is in solid-to-solid contact in said rotary kiln retort with additional hydrocarbon containing solid waste material W, thermal cracking of the hydrocarbon content of the additional solid waste material occurs thereby producing a high BTU content fuel gas.

2. The method as claimed in claim 1, wherein said solid waste material W is at least one material of the group consisting of steel industry waste water treatment plant sludge, automobile shredded refuse ASR, municipal waste MW, refuse derived fuel RDF, and oil mill scale.

3. The method as claimed in claim 1, wherein said step of recirculating at least said separated HCS back to said flash calciner furnace, comprises recirculating said separated HCS and said retorted solids RS back to said flash calciner.

4. The method as claimed in claim 1, further comprising the steps of separating the HCS and carbon from said retorted solids RS and recirculating at least the carbon content of the retorted solids back to the flash calciner furnace, and burning the recirculated carbon in said furnace as part of said fuel and oxygen mixture.

5. The method as claimed in claim 1, wherein said solid waste material W is initially a wet solid waste material W', and said method further comprises the step of prefeeding said wet solid waste material W' into a rotary drum dryer and heating said wet solid waste material W' by adding drying stage hot heat carrier solids HCS to said wet solid waste material W' in said drying drum in direct contact with said drying stage HCS and at a temperature and a time sufficient to dry said solid waste material W, prior to mixing said solid waste material W' with said HCS in said rotary kiln retort.

6. The method as claimed in claim 5, wherein said drying stage heat carrier solids HCS added to said wet solid waste material W' in said rotary drum dryer are preheated by passing the products of combustion of said flash calciner furnace through said drying stage HCS prior to adding the drying stage HCS to said drum dryer.

7. The method as claimed in claim 6, wherein said drying stage HCS added to said drum dryer are heated to a temperature of approximately 1000° F. by said products of combustion from said flash calciner furnace.

8. The method as claimed in claim 7, wherein said flash calciner comprises a flash furnace and a cyclone separator downstream of said furnace, and wherein said drying stage HCS providing direct contact heating of said wet solid waste material W' in said drum dryer are heated by causing said drying stage HCS to enter the hot products of combustion after discharge thereof from said flash calciner cyclone separator and said hot products of combustion are then introduced into a preheat cyclone which separates the hot drying stage HCS from the products of combustion from said flash furnace.

9. The method as claimed in claim 5, further comprising the step of passing said dry solid waste material W from said drum dryer after drying of the same through a screen separator and separating the drying stage HCS from the dry solid waste material W and passing said HCS free dry solid waste material W directly to said rotary kiln retort.

10. The method as claimed in claim 5, further comprising the step of passing said wet solid waste material W' and a portion of the dry solid waste material W after separation from said drying stage HCS by a screen separator through a pug mill prior to feeding said wet solid waste material W' to said drum dryer thereby reducing the overall moisture content of the solid waste material passing through said drum dryer.

11. The method as claimed in claim 1, further comprising the step of heating compressed air in a combustion chamber by ignition of a fuel and air mixture therein to create a flow of products of combustion PC from an air heater upstream of the flash calciner and feeding said recirculating HCS into said products of combustion upstream of an inlet of said flash calciner to ensure heating of said heat carrier solids (HCS) to a temperature on the order of 1800° F. in said flash calciner prior to separation of said HCS from said products of combustion in a cyclone separator downstream of said flash calciner.

12. The method as claimed in claim 11, further comprising the step of preheating air supplied to an air heater upstream of an air heater combustion chamber by recuperative heat exchange between compressed air and products of combustion discharged from the cyclone separator.

13. The method as claimed in claim 1, further comprising the step of discharging the products of combustion from said flash calciner through a cyclone separator by subjecting the flow of products of combustion from the cyclone separator to a fan and feeding said products discharged from said fan through a vertical stack for discharge of contaminant-free clean exhaust gas to the atmosphere.

14. The method as claimed in claim 13, further comprising, the step of passing the products of combustion from the cyclone separator through a bag house dust collector and filtering out particulate matter prior to discharging the products of combustion from said stack.

15. The method as claimed in claim 14, further comprising the steps of separating retorted solids RS from the HCS, collecting particulate matter discharged by the bag house dust collector and discharged by a disengaging chamber receiving the output of the rotary kiln reactor after separation of retorted solids RS from the HCS, through a water jacket screw, and storing said particulate matter and said retorted solids RS in a surge bin for selective periodic removal therefrom.

16. The method as claimed in claim 1, wherein said flash calciner furnace includes a fuel nozzle and an air heater upstream of said flash calciner, and said fuel nozzle of said flash calciner furnace and said fuel nozzle of said air heater are connected to a product gas discharge line downstream of a disengaging chamber, and said method further comprises feeding at least a portion of a product gas G to said fuel burners from said product gas discharge line such that the product gas G provides fuel for said air heater and for said flash calciner furnace for preheating said HCS to a temperature of approximately 1800° F.

17. The method as claimed in claim 1, wherein said hydrocarbon content solid waste material W has a glass content, and said method further comprises the step of controlling the HCS temperature to that ensuring that all of the hydrocarbon content of the solid waste material W is converted by thermal cracking directly into a high BTU gas product and a retorted solids including carbon, but below that causing said glass content to agglomerate during mixing of the solid waste W with the HCS in said rotary kiln retort.

18. The method as claimed in claim 17, wherein said HCS temperature is controlled by measuring a residual mixture temperature of the HCS and retorted solids carbon and by controlling the temperature of the HCS leaving the furnace of the flash calciner and the amount of HCS fed to the rotary kiln retort.

19. The method as claimed in claim 18, wherein the HCS is heated in said flash calciner to about 1334° F. and the HCS and retorted solids leaving the rotary kiln retort has a temperature of 1289° F.

20. The method as claimed in claim 1, wherein said hydrocarbon content solid waste material W includes a glass content, and wherein said method further comprises the step of discharging HCS and retorted solids RS from said rotary kiln retort into a trommel having a trommel screen with a mesh opening size which is larger than the average size of the HCS, but less than the average size of glass agglomerates formed during the passage of solid waste W and HCS through said rotary kiln retort, and discharging from an end of the trommel remote from the rotary kiln retort, glass agglomerates separated from the HCS and retorted solids RS.

21. The method as claimed in claim 20, wherein said hydrocarbon content solid waste material W comprises refuse derived fuel RDF, said HCS comprises aluminum oxide particles, the step of mixing solid waste W with the HCS in said rotary kiln retort comprises mixing RDF and HCS in a ratio of 9:50 by weight, and wherein temperatures of the aluminum oxide HCS particles and of the RDF in said rotary kiln retort are 1334° F. and 45° F., respectively, wherein glass agglomerates are separated from the HCS and retorted solids RS downstream of the rotary kiln retort, and wherein a temperature of the HCS and retorted solids RS upon separation from the glass agglomerates is 1289° F., and wherein HCS exiting the rotary kiln retort is devoid of glass agglomerates.

22. The method as claimed in claim 20, wherein said hydrocarbon content solid waste material W is refuse derived fuel RDF with a glass content, said heat carrier solids HCS comprise aluminum oxide or sand having a mesh size of −8 mesh +14 mesh, said HCS is preheated to a temperature of approximately 1700° F., said preheated HCS is mixed with said RDF at a RDF temperature of 51° F. in said rotary kiln retort, wherein said trommel screen is provided with 10 mesh openings, a temperature of the HCS and a retorted solids carbon is 1425° F., glass agglomerates are separated within the trommel screen of +8 mesh, and there are no visible glass agglomerates within the HCS and retorted solids.

* * * * *